United States Patent
Marmorek

[11] 3,866,095
[45] Feb. 11, 1975

[54] PLASTIC ENCASED COMPONENT WITH REFLOWED-PLASTIC SEALED LEADS

[75] Inventor: H. Stephen Marmorek, Toronto, Ontario, Canada

[73] Assignee: Sprague Electric Company, North Adams, Mass.

[22] Filed: July 13, 1973

[21] Appl. No.: 379,021

[52] U.S. Cl............ 317/230, 174/50.52, 174/50.57
[51] Int. Cl................................................ H01g 9/00
[58] Field of Search............. 174/525, 50.52, 50.57; 317/230

[56] References Cited
UNITED STATES PATENTS

| | | | |
|---|---|---|---|
| 2,264,405 | 12/1941 | Poitras | 317/230 |
| 2,298,441 | 10/1942 | Waterman | 317/230 |
| 2,623,101 | 12/1952 | Kurland et al. | 317/230 |
| 2,665,329 | 1/1954 | Brennan | 317/230 |
| 3,648,337 | 3/1972 | Greskamp et al. | 317/230 |

*Primary Examiner*—Andrew J. James
*Attorney, Agent, or Firm*—Connolly and Hutz

[57] ABSTRACT

An electrolytic capacitor is housed by a thermoplastic housing being sealed to a thermoplastic cover. The capacitor leads pass through holes in the cover and are each welded to an adjacent terminal outside the cover. The terminals and the leads are embedded and sealed in the plastic cover in a region adjacent to the inner side of the cover. A method for simultaneously embedding the terminals and heat sealing the adjacent leads is also described.

6 Claims, 9 Drawing Figures

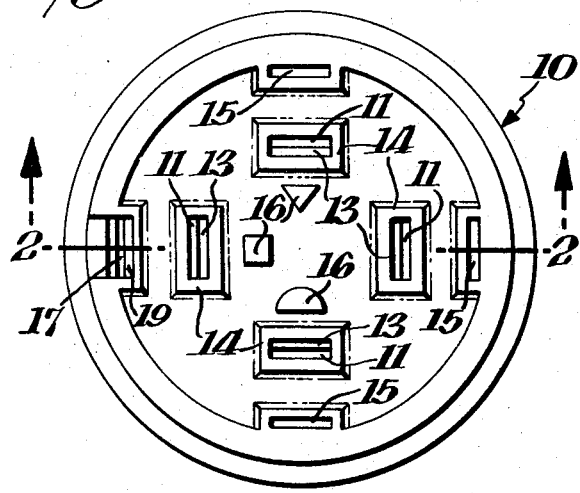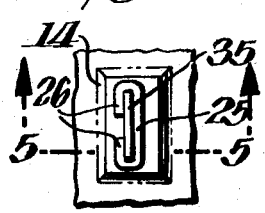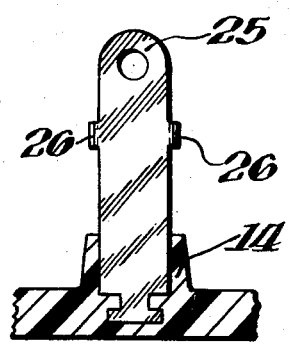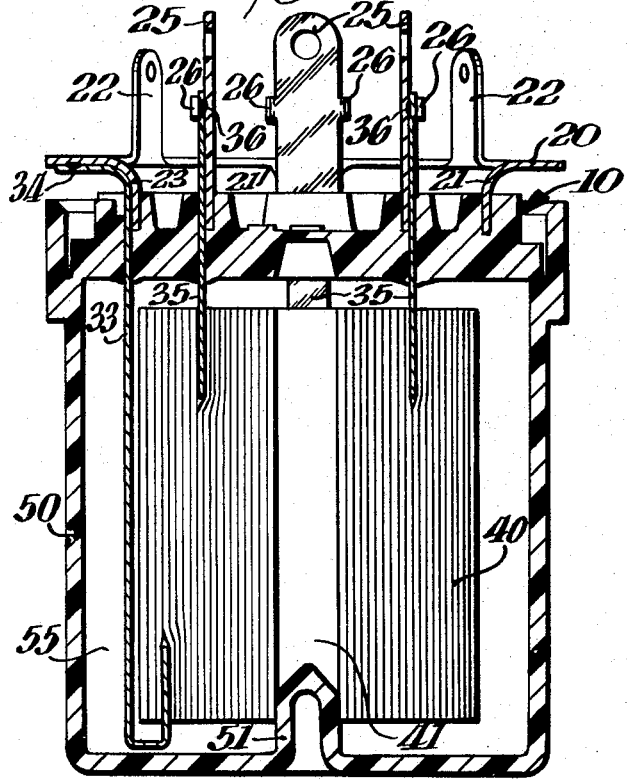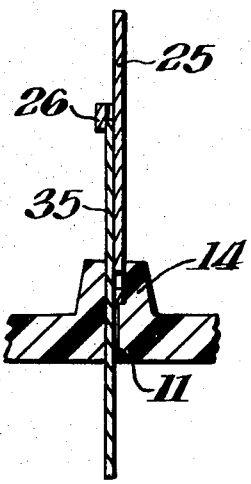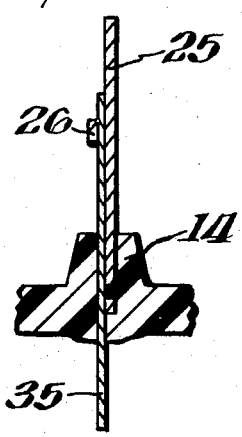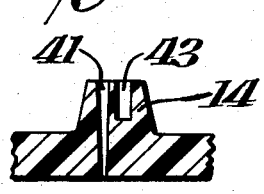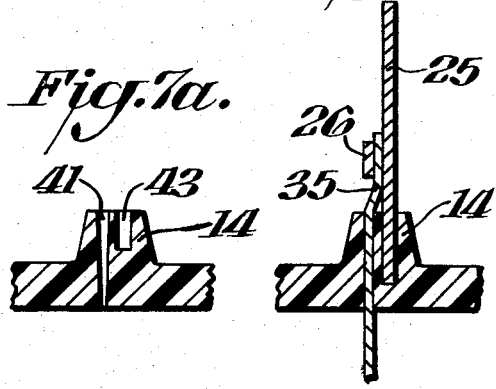

PLASTIC ENCASED COMPONENT WITH REFLOWED-PLASTIC SEALED LEADS

BACKGROUND OF THE INVENTION

This invention relates to sealed packages for electrical components and more particularly to sealed terminals and thermoplastic housings for electrolytic capacitors.

It is well known to use thermoplastic materials to house electrical components. Thermoplastics are especially impervious to moisture and gasses, and are easily heat sealed and have low cost. Components are often molded with terminals in place resulting in a completely solid integral package. Such packages, however, have the drawback that the component body and affixed terminals must be carefully fitted into an intricately shaped mold cavity prior to molding. Furthermore electrolytic capacitors require a method of venting evolved gasses to prevent explosion and thus such solid packages are generally unsuitable.

Thermoplastic cases have been used for electrolytic capacitors having molded-in terminals in a plastic cover, to which the capacitor leads are fastened on the inside of the cover prior to sealing the cover to a thermoplastic housing. This provides the necessary air space to cushion the evolving gasses but involves a difficult expensive process in the fastening of leads to terminals in tight quarters. Also capacitor electolytes are known to chemically attack and corrode the joints of leads to terminals.

In fact for electrolytic capacitors, it is desirable to avoid exposure of materials such as phenolics, rubbers, epoxy, and metals other than the valve metal of the kind employed in the capacitor. The chemical action and absorption of the electrolyte with such other materials not only tends to limit the useful life of the structure of the package but also may produce byproducts that contaminate the electrolyte itself and degrade the quality of the capacitor.

The most common approach in the past uses a three layer cover assembly having a resilient rubber material sandwiched in compression to provide the sealing of the leads in the cover, and of the cover to a metal can housing. Such a capacitor is the common "self mounting" aluminum electrolytic package (e.g., the TWIST-LOK, a trade name of the Sprague Electric Company, North Adams, Mass.) The capacitor leads pass through the cover and rubber seal and are connected to terminals mounted therein on the outside of the cover thus avoiding exposure of the joint to the electrolyte. This design provides a workable system at the expense of relative complexity and difficulty in assembly.

It is therefore an object of this invention to provide a sealed component package having a low cost.

It is a further object of this invention to provide a component package being capable of an almost fully automatic assembly process.

It is a further object of this invention to provide a sealed electrolytic capacitor package wherein lead to terminal joints are on the outside of the package and no corrodable materials are exposed to the electrolyte.

It is a further object of this invention to provide a low cost aluminum electrolytic package having equivalent mounting means to conventional self mounting capacitor packages, requiring no retooling on the part of the users.

SUMMARY OF THE INVENTION

A sealed electrical component package has an electrical component and an airspace encased in a thermoplastic housing with a thermoplastic cover sealed thereto. The cover has holes in which the component leads are sealed. Lying essentially adjacent to and essentially parallel with the leads are metal terminals, one end of which is embedded in the plastic cover from the outside. A connection is made outside the cover between each lead and said essentially adjacent terminal. In one version, the component package additionally has a metal ring positioned outside of and concentric with the cover. The ring has extended tab portions bent inward and embedded in the cover from the outside. One of these inward bent portions serves as an additional terminal, being essentially adjacent to and essentially parallel with a sealed lead in the cover and connected thereto. A method for making said package comprises threading each component lead through a hole in the cover and embedding an essentially adjacent terminal in the cover while simultaneously sealing the lead in the hole by a heat and pressure process preferably by ultrasonic welding.

BRIEF DESCRIPTION OF THE DRAWINGS

In FIG. 1 is shown the top view of a thermoplastic cover.

In FIG. 2 is shown a side sectional view of the cover taken in the plane 2—2 as indicated in FIG. 1.

In FIG. 3 is shown a side sectional view of the component package according to a preferred embodiment of this invention employing the cover of FIGS. 1 and 2.

In FIG. 4 is a detail drawing showing a terminal and associated component lead of the package of FIG. 3 as viewed from the top of the package, prior to an embedment step.

In FIG. 5a is shown a sectional view of the detail of FIG. 4 in plane 5—5 before the embedment step.

In FIG. 5b is shown a sectional view of the detail after embedment in plane 5—5.

In FIG. 6 is shown a detail in sectional view of a terminal in the plane of one terminal face after the embedment.

In FIG. 7a is shown a detail sectional view of a cover pedestal having an alternative geometry.

In FIG. 7b is shown a detail view of the alternative pedestal of FIG. 7a with lead and terminal sealed and embedded therein.

DESCRIPTION OF THE PREFERRED EMBODIMENT

In FIG. 3 is shown a side-sectional view of the component package of this invention, employing the circular cover 10 shown in FIGS. 1 and 2. The cover 10 is of a thermoplastic material having been formed by the low cost method of injection molding whereby all the features indicated in FIGS. 1 and 2 have been provided. Each of the four raised portions of the cover 10, namely pedestals 14, contain a tapered rectangular hole 11 having a slightly smaller aperture at the bottom or inside compared to the aperture at the top or outside of the cover 10. Each of the four pedestals 14 also contain one rectangular slot 13 that is adjacent to the hole 11 and opens only on the top side of the cover 10. Terminal identification symbols are provided on the outside of the cover 10, there being associated with each of three pedestals 14, a slightly raised symbol 16 having the forms of a triangle, a square, and a semicircle, respectively. Also in the outside and extending around the peripheral region of the cover 10 is another raised portion having four equally spaced rectangular slots, three of which are designated 15 and one 19. Adjacent to only slot 19 is a hole 17 extending through the cover 10. In the center of the cover there is a thinned region 12 that serves as a vent for the package to properly relieve pressure that may build up in the completed package and otherwise cause explosion. Alternatively, a conventional plug vent may be employed here or a weakened section of the plastic housing may serve as the vent.

In the bottom side and at the periphery of the cover 10 there extends downward a wedge shaped portion 18 of thermoplastic material that serves as an ultrasonic weld bead during the ultrasonic welding and sealing of the cover 10 to the open end of the thermoplastic housing 50 as shown in FIG. 3.

In FIG. 3 the side sectional view of a rolled foil type aluminum electrolytic capacitor 40 is seen enclosed by housing 50 and cover 10. The rolled capacitor 40 has one cathode foil having a conventional inserted tab lead 33 in contact therewith. The capacitor 40 has four anode foils (not shown) there being associated with each an aluminum inserted tab lead 35 (only three of which may be seen in this sectional view). The open center region 41 of capacitor 40 is partially invaded and held by a thermoplastic protrusion 51 that is an integral part of the housing 50.

Four metal terminals 25 (only three of which may be seen in FIG. 3) each have bottom ends that have been embedded in the four cover slots 13 respectively, by a pressure and heat embedment process such as ultrasonic "welding." Each of the four anode tab leads 35 passes through and is sealed in one of the four cover holes 11. Each of the anode tab leads 35 is thus seen to be essentially parallel and essentially adjacent to a terminal 25, in a region just beyond the outer side of said cover. A weld 36 joins the terminal 25 and lead 35 in this region. This weld may be accomplished by a normal electrical energy discharge weld, an ultrasonic weld or by other normal means.

A metal ring 20, positioned concentrically and just above the cover 10, has four tab portions 22 (only two of which are visible in the sectional view of FIG. 3). Four other extended tab portions are bent downward and are embedded in slots in the cover, the three tabs 21 being embedded in cover slots 15, and tab 23 being embedded in slot 19. The aforementioned common cathode lead 33 passes through and is sealed in the cover hole 17. Lead 33 runs adjacent to tab 23 and is connected to the underneath side of ring 20 by weld 34. Alternatively, the tab 23 may be adjacent to the other face of the lead 33 which may then be weld connected to the top side of ring 24. Thus the four-section aluminum electrolytic capacitor 40 is completely contained and sealed within the thermoplastic housing 50 and the cover 10. Furthermore, this construction permits the provision of an appropriate air space 55 to cushion the generation of gas pressure within the package. The capacitor is physically stabilized by the protrusion 51. Of key importance is the absence of any metal within the sealed housing other than the pure aluminum foils and leads, the absence of any lead to terminal welds or connections, and the absence of any phenolic or rubber materials within the sealed housing. This feature makes it possible to employ a wide range of electrolytes in such packages, including those such as dimethyl formamide (DMF) that is chemically very active.

Packages of the preferred embodiment were built wherein the cover 10 and housing 50 were made by the injection molding of polypropylene. The major dimensions of the cover were, diameter 1.378 inches, overall height 0.265 inch, pedestal height 0.125 inch, terminal slots 0.031 inch wide, 0.172 inch long and 0.080 inch deep. The wall thickness of the housing 50 was 0.030 inch.

The packages were assembled by the following sequential steps:

1. Feeding the capacitor leads through the holes of the polypropylene cover.
2. Placing the anode terminals in the cover slots.
3. Embedding the terminals in the cover and simultaneously sealing the leads in the holes by applying pressure and ultrasonic energy to the terminals.
4. Bending the terminal lugs over the anode leads. (unless terminals with prebent lugs are used)
5. Dispensing an electrolyte into a polypropylene housing.
6. Placing the capacitor body in the housing and seating the cover in the open side of the housing.
7. Sealing the cover to the housing by applying ultrasonic energy to the cover.
8. Placing the inward bent tabs of the metal ring into the cover slots.
9. Embedding the tab ends into the cover and sealing the cathode lead in the cover hole by applying pressure and ultrasonic energy to the ring.
10. Cutting off the excess length of the cathode lead.
11. Welding the cathode lead to the metal ring by an energy discharge weld step.
12. Welding the anode leads to the terminals by an energy discharge weld step.
13. Cutting off the excess length of the anode leads (if necessary).

Although polypropylene is preferred, a wide variety of thermoplastic materials will be suitable for use in the practice of this invention, such as polyethylene, polyamide, polystyrene, polycarbonate, and polyacetate resins.

In FIG. 4 is shown the top view of a cover pedestal 14 with terminal 25 placed in the slot 13, and the adjacent lead 35 in hole 11, as would be seen after step 2 in the assembly process above. The section 5—5 indicated in FIG. 4 is shown in FIG. 5a. The same section is shown in FIG. 5b after step 3 in the assembly process. The preferred configuration of the bottom end of terminal 25 is shown in FIG. 6 wherein a detail section is shown in a plane of one face of the terminal indicating the complete embedment and locking in of the terminal by the reflowed plastic material of the cover. The lugs 26 in this view are shown unbent to clearly show their geometry.

The terminal 25 is made of 0.025 inch thick solder plated copper. Its lower embedded portion has the shape of an inverted "T." The T-bar portion is more narrow than the main stem of the terminal such that it just fits the cover slot 13 and is thus easily inserted and held therein prior to the embedment process step. The T-shape also enhances the locking power of the embedded terminal. The lower embedded portion of the terminal may have other irregular shapes to enhance the physical strength of embedment. Further, the lower end may be bent slightly away from the adjacent lead (not shown), advantageously avoiding dragging the adjacent lead downward.

The embedment process is preferably accomplished by simultaneously applying ultrasonic energy and a downward force to the terminal that causes the thermoplastic cover material in the vicinity of the slot 13 to liquefy and flow. During this process step the terminal 25 is pressed further into the cover 10 displacing hot molten plastic around the adjacent lead 35 and thereby sealing it in the hole 11. A slight bulging of the inner face of the cover, as shown in FIG. 5b, may be caused during the embedment step.

The heat and pressure generated by the ultrasonic embedment of the terminal has caused the reflowing plastic to form intimately and completely around the lead 35 in at least a lower portion of the hole 11. Terminal lugs 26 are then bent over the lead, unless prebent terminals are used, and the lead is welded to the terminal by a standard energy discharge welding method.

The four inward bent extended tab portions 21 of the ring 20 preferably also have an inverted T-configuration at the tab ends, thus similarly providing an enhanced locking mechanism of the plastic embedded tabs. Although four inward bent tabs are shown, as few as two may be used to achieve structural stability. Referring again to FIGS. 3 and 2, tab 23 is embedded adjacent to the sealed cathode lead 33.

In an alternative construction a thin web of plastic cover material is provided between slot 43 and hole 41 as shown in the detail sectional view of a typical pedestal 14 of FIG. 7a. Such a separating web, during the embedment of a terminal (or ring tab), tends to avoid the adjacent lead withdrawing into the housing. In FIG. 7b is shown a corresponding sectional view with lead 25 sealed in hole 41 and embedded terminal 25. Here again the lead 35 is essentially parallel and essentially adjacent to the terminal 25.

The embedment of ring tabs 21 and tab 23 has been simultaneously effected with the sealing of cathode lead 33 in hole 17. This is preferably accomplished by the application of ultrasonic energy and a downward force to the ring 20. The sealing of the cover to the housing is accomplished in a separate step by applying ultrasonic energy to the outer rim of the cover prior to placing the ring on the cover.

Also various methods may be used other than those employing ultrasonics for embedding the ring tabs and terminals, and sealing the leads in the cover holes. Other methods of applying heat to the ring tabs and terminals will be suitable, such as for example by preheating these parts before they are brought to the cover assembly.

In another variation, the terminals may be stamped from sheet metal leaving a piece of metal maintaining a connection between four terminals. Subsequently this group of four terminals is shaped so that all four are placed in their respective slots 13 in one motion. Embedment is then accomplished in one more motion and the connecting metal link between terminals cut away thereafter.

Also the terminal lugs 26 may be partially pre-bent so that after terminal embedment, the final crimping of the lugs over the leads and the welding of leads to terminal may be accomplished for all four anode terminals by one motion or step. This assumes that a special crimp and welding device is used. Such a procedure is made especially easy to accomplish by having the lug bending occur to the outside of each terminal.

Further savings in assembly costs can be realized by substituting a terminal similar to the anode terminals 25 of the preferred embodiment for the ring 20. However, the ring with its outward standing tabs provides a conventional grounding or mounting means similar to those of the many millions of "self mounting" aluminum electrolytic component packages that have been made and sold for decades for use in radios and in television sets. The package of the preferred embodiment thus is a direct replacement for existing capacitor packages requiring no special accommodation by users.

What is claimed is:

1. A sealed electrical component package comprising:
   a. an electrical component having two or more leads;
   b. a thermoplastic cover having holes through which said leads pass from an inner face of said cover to and projecting from an outer face of said cover, said leads being directly sealed therein;
   c. metal terminals, each lying essentially adjacent to and essentially parallel with one of said leads, an end of each said terminal being embedded in said outerside of said cover, each said terminal being electrically connected to said adjacent lead in a region outside said cover;
   d. a thermoplastic housing containing said component and an air space, said housing having an open side into which said cover is sealed; and
   e. a metal ring positioned outside of and concentric with said cover, said metal ring having extended tab portions at least two of which are bent inward relative to said package with the ends of said at least two tab portions being embedded in said thermoplastic cover, one of said inward bent tab portions being one of said metal terminals lying adjacent, essentially parallel with and electrically connected to one of said leads in the region beyond the outer face of said cover.

2. The package of claim 1 wherein said embedded end of at least one of said terminals is separated from said essentially adjacent lead by a thin web of said thermoplastic cover material.

3. The package of claim 1 wherein said embedded end of each said terminal has an irregular geometry so as to enhance the physical strength of said embedment.

4. The package of claim 1 wherein said component is a multisection electrolytic capacitor of the aluminum foil type having a common cathode foil, said one lead being an inserted tab type and being connected to said common cathode foil.

5. The package of claim 4 wherein two or more other of said tab portions extend outward with reference to said package, such that said outward extended tab portions may serve as a mounting means and as one electrical terminating means for said package.

6. The package of claim 4 wherein said sealed leads are heat and pressure sealed, and wherein said plastic cover is reflowed and distorted in the vicinity of each said lead.

* * * * *